(12) United States Patent
Bulte

(10) Patent No.: US 7,953,562 B2
(45) Date of Patent: May 31, 2011

(54) METHOD AND APPARATUS FOR MEASURING THE STRESS OR STRAIN OF A PORTION OF A FERRO-MAGNETIC MEMBER

(75) Inventor: Daniel Peter Bulte, Marston (GB)

(73) Assignee: Daniel Peter Bulte, Oxford (GB)

( * ) Notice: Subject to any disclaimer, the term of this patent is extended or adjusted under 35 U.S.C. 154(b) by 507 days.

(21) Appl. No.: 12/065,362

(22) PCT Filed: Aug. 30, 2006

(86) PCT No.: PCT/GB2006/003217
§ 371 (c)(1),
(2), (4) Date: Apr. 28, 2008

(87) PCT Pub. No.: WO2007/026148
PCT Pub. Date: Mar. 8, 2007

(65) Prior Publication Data
US 2008/0221810 A1   Sep. 11, 2008

(30) Foreign Application Priority Data
Sep. 1, 2005   (GB) .................................. 0517815.7

(51) Int. Cl.
*G01L 1/00*   (2006.01)
(52) U.S. Cl. ........................................................ 702/42
(58) Field of Classification Search .................. 702/42
See application file for complete search history.

(56) References Cited

U.S. PATENT DOCUMENTS

| | | | |
|---|---|---|---|
| 3,535,625 A | 10/1970 | Pratt | |
| 5,195,377 A | 3/1993 | Garshelis | |
| 6,424,149 B1 * | 7/2002 | Takahashi | ..................... 324/209 |
| 2001/0007422 A1 | 7/2001 | Noe et al. | |
| 2002/0157478 A1 * | 10/2002 | Seale | ............................. 73/789 |

FOREIGN PATENT DOCUMENTS

| | | |
|---|---|---|
| EP | 1098194 | 5/2001 |
| EP | 1431759 | 6/2004 |
| WO | 9014574 | 11/1990 |
| WO | 9924803 | 5/1999 |

OTHER PUBLICATIONS

GB0517815.7 Search Report dted Dec. 13, 2005, 1 page.
PCT/GB2006/003217 International Search Report dated Oct. 31, 2006, 2 pages.

* cited by examiner

*Primary Examiner* — Aditya Bhat
(74) *Attorney, Agent, or Firm* — Michael Best & Friedrich LLP

(57) ABSTRACT

A method and apparatus for measuring stress or strain in a portion of a ferromagnetic member is disclosed in which advantage is taken of the fact that the magnetic properties of a ferromagnetic member change with applied tensile or compressive stress. A magnetic hysteresis loop is measured in a portion of a ferromagnetic member and a model of a magnetic hysteresis loop is fitted to the measured magnetic hysteresis loop by varying at least one stress or strain dependent model variable and the fitted at least one variable is used to determine the stress or strain of the portion. The particular model disclosed is a predator/prey pursuit model wherein the prey is the applied field and the predator is the flux density.

40 Claims, 2 Drawing Sheets

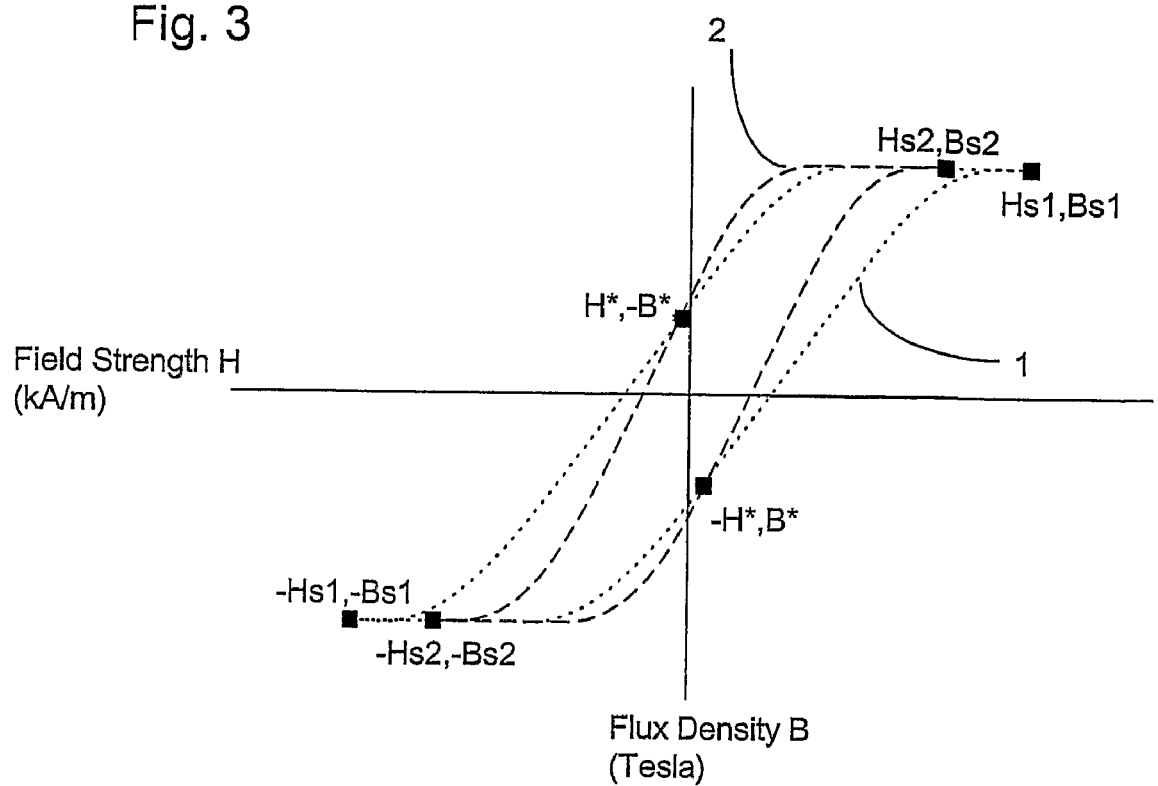

METHOD AND APPARATUS FOR MEASURING THE STRESS OR STRAIN OF A PORTION OF A FERRO-MAGNETIC MEMBER

CROSS-REFERENCE TO RELATED APPLICATIONS

This patent application is a national stage filing under 35 U.S.C. 371 of International Application No. PCT/GB2006/003217, filed 30 Aug. 2006, which claims priority to Great Britain Patent Application No. 0517815.7, filed 1 Sep. 2005, the entire contents of which are hereby incorporated by reference. Priority to each application is hereby claimed.

The present invention relates to a method of and apparatus for measuring stress or strain in a portion of a ferromagnetic member and to a way of generating material specific parameters for use in such a method and such an apparatus.

It is known that the magnetic properties of ferromagnetic materials alter with variations in externally applied stress. A theory of the origins of the so called "magnetomechanical effect" is given by Bulte and Langman in "Origins of the Magnetomechanical Effect" Journal of Magnetism and Magnetic Materials 251 (2002) 229-243.

Efforts have been made to harness this change in magnetic properties with externally applied stress to provide a non-destructive way of measuring stress in a member of ferromagnetic material. In one such method, known as MAPS, a magnetic field is applied to a portion of the member and rotated around 360° and the flux density in the portion is measured. The method is further complicated by the need for the use of strain gauges on the surface of the portion. Unfortunately this method is complicated and not particularly accurate.

U.S. Pat. Nos. 6,345,534 and 6,424,149 disclose a method in which a magnetic field is applied to a portion of material and the magnetic field strength at zero flux density is measured along with the magnetic susceptibility which is the rate of change of the magnetic field at zero flux density. These two parameters are used to estimate the change in effective stress due to aging of the test material so that the fatigue of a material can be determined in an non-destructive way.

It is desirable to provide a more accurate way of measuring stress or strain in a portion of a ferromagnetic member in a non-destructive way using the magnetomechanical effect and to provide an apparatus to carry out the method.

The present invention provides a method of measuring the stress or strain of a portion of a ferromagnetic member, said method comprising: measuring a first magnetic hysteresis loop of said portion; fitting a model of a magnetic hysteresis loop to said first measured magnetic hysteresis loop by varying at least one stress or strain dependent variable of said model; and using said fitted at least one variable to determine the stress or strain of said portion.

The present invention further provides an apparatus adapted to measure the stress or strain of a portion of a ferromagnetic member, said apparatus comprising: a controller adapted to generate and measure a magnetic hysteresis loop in said portion; a processor adapted to fit a model of a magnetic hysteresis loop to a hysteresis loop measured by said controller by varying at least one stress or strain dependent variable of said model; and a determinator adapted to determine the stress or strain in said portion using said fitted stress or strain dependent variable from said processor.

The present invention further provides a method of generating material specific parameters for use in the above method, said method of generating comprising: applying a stress or strain to a portion of a ferromagnetic member; measuring a first magnetic hysteresis loop of said portion; fitting a model of a magnetic hysteresis loop to said measured magnetic hysteresis loop by varying at least one stress or strain dependent variable of said model; and associating said fitted at least one variable to said applied stress.

The present invention further provides material specific data generated by the above method of generating.

The present invention further provides a method of measuring the stress or strain of a portion of a ferromagnetic member, said method comprising: measuring a first magnetic hysteresis loop of said portion; measuring a second magnetic hysteresis loop of said portion in a direction orthogonal to the direction in which said first magnetic hysteresis loop is measured; and using said measured data to determine the stress or strain of said portion in two dimensions.

The present invention further provides an apparatus adapted to measure the stress or strain of a portion of a ferromagnetic member, said apparatus comprising: a controller adapted to generate and measure two magnetic hysteresis loops in said portion in directions orthogonal to one another; and a processor to determine the stress or strain in said portion on the basis of said measured magnetic hysteresis loops.

The present invention will now be described by way of non limiting example only with reference to the following drawings in which:

FIG. 3 illustrates a typical magnetic hysteresis loop of a ferromagnetic material under two different stresses.

The present invention takes advantage of the fact that the magnetic properties of a ferromagnetic member change with the applied tensile or compressive stress. The invention is useful in the fields of engineering, surveying, insurance assessing, construction and health and safety to name but a few. The invention can be used to measure stresses or strains of structural materials in bridges, railway tracks, steel girder buildings, cranes, oil rigs, transmission towers, oil pipelines, ships, trucks (LGV's), funfair rides, industrial machinery, trains, mines, for example. Ferromagnetic materials include iron, nickel, cobalt and their alloys including steel.

Figure 1:
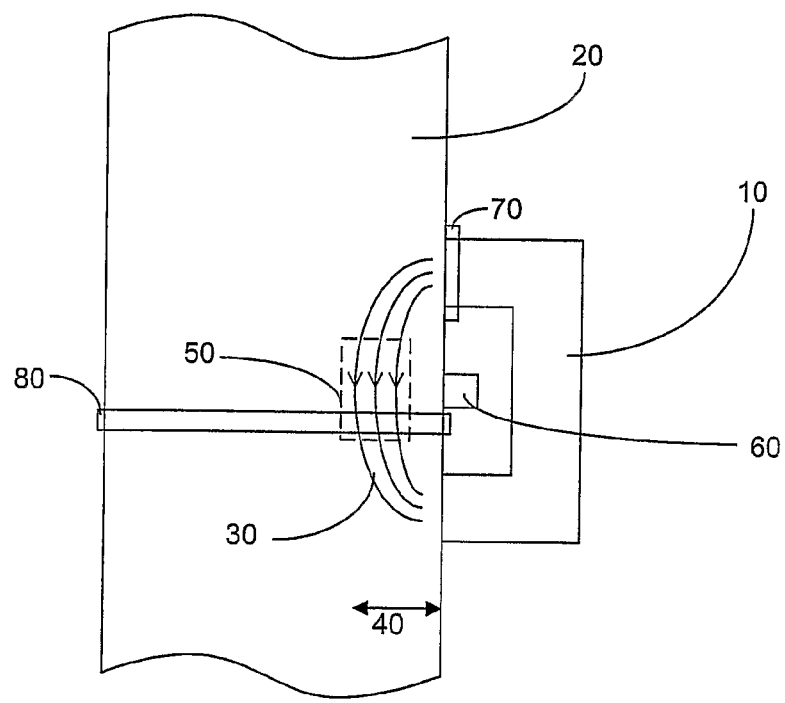
FIG. 1 shows a first embodiment of the apparatus of the present invention showing the principal of operation.

A magnetic field is applied to a portion of a ferromagnetic member. The field can be applied in any way by magnetic field generator and two examples of how to apply the field are given in FIGS. 1 and 2. In FIG. 1 a U-shaped electromagnet 10 is held against the surface of a ferromagnetic member 20. The surface of the magnetic member 20 may need to be cleaned or otherwise prepared to ensure good magnetic contact between the surfaces of the U-shaped electromagnet 10 and the member 20 thereby to generate flux lines 30 in a portion 50 of the ferromagnetic member 20.

It is the stress in the portion 50 through which the flux lines 30 pass which is measured. Thus, by varying the geometry of the electromagnet 10 the stress or strain in different portions 50 at different depths of the ferromagnetic member can be measured. Arrow 40 indicates the depth of the portion at which the strain of a ferromagnetic member 20 is measured by the apparatus illustrated in FIG. 1. The stress at different locations can be measured by moving the electromagnet to different locations.

The apparatus may further comprise a magnetic field strength sensor 60 such as a hall plate. However, the presence of hall plate is not necessary and the magnetic field strength which is measured by the hall plate can instead be calculated theoretically from the design of the electromagnet 10, 100. The flux density in the portion 50, is measured by a flux density sensor or, for example, by integrating the current induced in a coil of wire 70 surrounding the flux 30 in the electromagnet at the surface of the member 20. Alternately the flux may be measured by integrating the current induced in a coil of wire 80 surrounding the flux 30 in portion 50 of the member 20.

Figure 2:
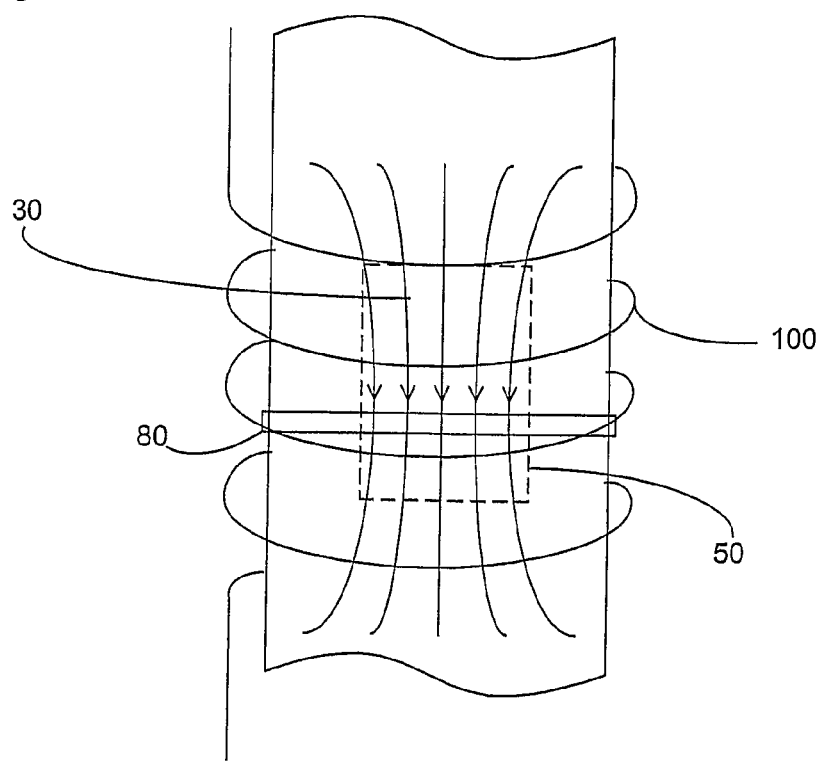
FIG. 2 shows a second embodiment of the present invention showing the principal of the present invention.

In an alternative embodiment, the flux can be induced in the portion 50 using a solenoid 100 such as that illustrated in FIG. 2. An advantage of this is that the member 20 does not need to be cleaned. This type of arrangement may be more difficult to design. However, it is possible for the magnetic field generator to be incorporated into the ferromagnetic member 20 during manufacture of the ferromagnetic member. In this way it is easier to measure the stress or strain in a portion of the ferromagnetic member at a greater depth.

During manufacture the flux density generator (for example a coil of wire) would be implanted into or onto a ferromagnetic member and leads would be left exposed which could later be connected to a machine which could be used to induce flux in the portion 50 which is to be measured. A hall plate or other magnetic field strength sensor could also be implanted as could a flux density sensor and both could be similarly connected to an external and removable apparatus where measurement of stress is required.

Other types of magnetic field generator, magnetic field strength sensor or calculator and flux density sensor may be used other than those illustrated in FIG. 1 or 2 and described above. They may either be removable from the ferromagnetic member 20 or may be implanted, for example, during manufacture.

In the present invention a controller is used to control the field strength applied to the portion 50 of the ferromagnetic member by the magnetic field generator e.g. by varying the current through the coil. The field strength is increased from zero in a positive direction until the portion is magnetically saturated (i.e. the degree of magnetisation at which a further increase in magnetisation force produces no significant increase in the magnetisation in the portion). The field strength H is then reduced, through zero to a negative saturation before returning to zero. The field is changed at a slow enough rate so as not to induce eddy currents in the member. During this time the flux density B in the portion is measured and this produces a hysteresis loop, made up of an acquired data set comprising points around the loop, such as the ones illustrated in FIG. 3.

FIG. 3 shows two magnetic hysteresis loops (labelled 1 and 2). These types of offset hysteresis loops 1, 2 are obtained both at different levels of stress or strain in the portion 50 in which the magnetic hysteresis loop is generated and also when the field is applied in orthogonal directions (i.e. at 90° to each other). In the latter case the loops can be used to measure the stress in both the x and y directions irrespective of stress or strain history. This is the preferred embodiment of the present invention but it is not necessarily necessary to measure the magnetic hysteresis loops in orthogonal directions and in some circumstances it may be possible to measure only the magnetic hysteresis loop in a single direction. For example, if a ferromagnetic member which is to be measured for its stress or strain is in uniaxial tension, it will only be necessary to measure only one hysteresis loop. Also, if the stress or strain in a single direction only is required it is possible to perform the present invention with only measuring the hysteresis loop in a single direction.

The present inventors have found that it is possible to model the magnetic hysteresis loop using a model which only has a stress or strain dependent variable or variables. Thus, by fitting the model to the measured magnetic hysteresis loop by varying the stress or strain dependent variable to minimise deviation from the measured curve it is possible to make an estimate of the stress or strain present in the portion 50 from a knowledge of the magnetic behaviour under varying stress or strain of the material under investigation and to generate an electrical signal representing the stress or strain of the sample.

Therefore, it is necessary to have a database of stress or strain dependent variables of the model which fit hysteresis curves produced at different levels of stress or strain for a particular material type. Such a database is generated by providing a series of test specimens each under different stress or strain and generating magnetic hysteresis loops as illustrated in FIG. 3 in each of the samples. The model is then fitted to the measured magnetic hysteresis loops and the value of the best fitting variable(s) is then noted as being indicative of the stress or strain of that test sample. By performing a plurality of such tests with samples at different stresses or strains it is possible to either generate a look-up table of best fitting variable(s) vs stress or strain or to fit a curve to the data so that an equation can be used to determine the stress or strain of a sample from a knowledge of the best fitting variable (s).

The inventors have found that almost all structural, mild steels share the same variables for the particular model described below. Therefore, this model has the advantage that it can be used on the majority of types of steel which are likely to have their stress or strain measured using this technique.

The model takes advantage of the fact that magnetic hysteresis loops for steel share a coincident point at which all magnetic hysteresis loops, irrespective of the stress or strain of the portion 50 in which the magnetic hysteresis loop is generated coincide. In FIG. 3 the coincidence points are in the second and fourth quarters of the graph and are illustrated as being at positions $-H^*, B^*$ and $H^*, -B^*$. Each of the magnetic hysteresis loops or curves can then be split into four parts each part being between a coincidence point and a point of saturation. The points of saturation are illustrated in FIG. 3 as $H_s$, $B_s$ and $-H_s$, $-B_s$. The curves from $(+H^*, -B^*)$ to $(+H_s, +B_s)$ and from $(-H^*, +B^*)$ to $(-H_s, -B_s)$ are negatives of each other, as are the curves from $(+H_s, +B_s)$ to $(-H^*, +B^*)$ and from $(-H_s, -B_s)$ to $(+H^*, -B^*)$.

In a given material the coincident points will occur at plus or minus a given field strength $H^*$ which is a constant for that material irrespective of stress or strain. The precise saturation points for a given material are strain dependent and thus as the strain may be unknown, the exact field at which the material will saturate in a given direction is also unknown. Thus, hysteresis loops must be obtained from the member using a sufficiently high applied field so as to guarantee saturation in most materials under most plastic strains. Under these conditions the maximum points will most likely (but not necessarily) also coincide and thus it is only the shape of the curve joining the saturated maximum point and the coincident point which is stress or strain dependent.

A so-called predator/prey pursuit model is then fitted to each of the four curves of each hysteresis loop. In the predator/prey pursuit model the prey is the applied field H and the predator is the flux density B. If the predator/prey pursuit model includes an acceleration term for the predator (flux density) the shape of the curve between each of the coincidence points and the saturation points can be described by the following equation:

$$B = B^* + b\left(\frac{(1-e^{-k(H-H^*)/a})}{(1-e^{-k})}\right)\left(\frac{H-H^*}{a}\right)^{1/r}$$

in which B is the flux density, H is the field strength, $B_s$ is the flux density at saturation, $H_s$ is the field strength at saturation, B* is the flux density at the point of coincidence, H* is the field strength at the point of coincidence, b=$B_s$–B*, a=$H_s$–H* and k and r stress or strain dependent variables.

The fit of the model to the curves can be optimised using any method which produces a good fit of the two parameters k and r which are stress or strain dependent (for example a least squares method, or a general linear model). This may be done by averaging the values for k and r which produce the best fit for each curve, or by fitting the best values k and r for all curves or even by fitting the best values for k and r to pairs of curves and then averaging. Once the best fit has been achieved it is possible to go to the generated material specific look-up table or equation to determine the longitudinal and transverse strains or stresses in the x and y directions.

In the above model, k and r are both dependent on the stresses or strains in the longitudinal and transverse directions and in this instance it is convenient to measure two hysteresis loops generated with a magnetic field which is applied in orthogonal directions so that the variables k and r can be resolved to eliminate the possibility of any ambiguity to obtain the stress or strain in both the longitudinal and transverse directions. That is, for some stress patterns, there may be multiple values which will fit the equations for any one loop generated in one direction. However, by using two perpendicular data sets this ambiguity is removed as the ambiguity will only exist for one orientation (if it exists at all). If perpendicular measurements are used, each loop is modelled individually and k and r values for each loop will be different.

It has been found that the stress dependent variables take the form $$k \propto Ae^{-(Bx-Cy+D)^2}$$

where A, B, C and D are material constants and so it is possible to produce equations for the variables so that the stresses or strains can be determined from the fitted stress or strain dependent variables without the need to use a look-up table.

A single machine could be used to measure the hysteresis loops in the two orthogonal directions without the need to re-attach the apparatus to the surface of the ferromagnetic member. Typically this would involve using two U-shaped electromagnets positioned orthogonally to one another.

Of course the predator/prey pursuit model works well even if the points at which the hysteresis loop is split is not exactly at the coincidence points or the saturation points. Other models than the predator/prey pursuit model described above may also work, if the model has only stress or strain dependent variables which can be optimised for best fit of all or part(s) of the measured hysteresis loops.

Measuring two hysteresis loops at 90° to each other allows a two dimensional stress or strain map to be developed. This can be done by a machine which only needs to be placed once on the member (and has, for example, two u-shaped magnetic field generators positioned at 90° to each other) or by removing the machine after the first reading, rotating it by 90° and replacing the machine before making a second measurement.

The invention claimed is:

1. A method of measuring the stress or strain of a portion of a ferromagnetic member, said method comprising:

measuring, with a controller, a first magnetic hysteresis loop of said portion;

fitting a model of a magnetic hysteresis loop to said first measured magnetic hysteresis loop by varying at least one stress or strain dependent variable of said model; and using said fitted at least one variable to generate an electrical signal representing the stress or strain of said portion.

2. The method of claim 1, further comprising measuring a second magnetic hysteresis loop of said portion.

3. The method of claim 2, wherein said second magnetic hysteresis loop is measured in a direction orthogonal to the direction in which said first hysteresis loop is measured.

4. The method of claim 2, wherein fitting said model comprises determining two points of coincidence of said first and second measured magnetic hysteresis loops.

5. The method of claim 4, wherein fitting said model further comprises determining the field strength and flux density of said measured hysteresis loops at saturation and splitting each of said measured loops into four parts such that each part ends at either a point of coincidence or a point of saturation and fitting said model to each part.

6. The method of claim 1, wherein fitting said model comprises determining two points on said measured hysteresis loop at predetermined applied field strengths for that material.

7. The method of claim 1, wherein fitting said model comprises determining the field strength and flux density of said measured hysteresis loop at saturation.

8. The method of claim 1, wherein fitting said model comprises splitting said measured loop into four parts and fitting said model to each part.

9. The method of claim 1, wherein said model is a predator/prey pursuit model wherein the prey is the applied field and the predator is the flux density.

10. The method of claim 9, wherein the model is based on the following equation:

$$B = B^* + b\left(\frac{(1-e^{-k(H-H^*)/a})}{(1-e^{-k})}\right)\left(\frac{H-H^*}{a}\right)^{1/r}$$

in which B is the flux density, H is the field strength, $B_S$ is the flux density at saturation, $H_S$ is the field strength at saturation, B* is the flux density at the point of coincidence, H* is the field strength at the point of coincidence, b=$B_S$-B*, a=$H_S$-H* and k and r are said stress or strain dependent variables.

11. The method of claim 1, wherein each said at least one variable depends on the longitudinal and transverse strains or stresses of said portion.

12. The method of claim 11, wherein the at least one variable takes the form $$e^{-(x-y)^2}.$$

13. The method of claim 1, wherein said determining is done using said fitted variable(s) and material specific data.

14. The method of claim 1, wherein said determining is done by placing said fitted variable(s) into a material specific equation to give said stress or strain of said portion.

15. The method of claim 1, wherein said measuring includes applying a magnetic field to said portion increasing from zero to a value at which said portion is saturated and decreasing through zero to a value at which said portion is again saturated in the opposite direction, and returning to zero.

16. The method of claim 1, further comprising, during manufacture of said member, building in at least a part of a magnetic field generator and/or a flux density sensor for use in said measuring.

17. A structure comprising an integral magnetic field generator and/or flux density sensor for use in a method of claim 1.

18. A method of generating material specific parameters for use in a method of claim 1, said method of generating comprising:
    applying a stress or strain to a portion of a ferromagnetic member;
    measuring, with a controller, a first magnetic hysteresis loop of said portion;
    fitting a model of a magnetic hysteresis loop to said measured magnetic hysteresis loop by varying at least one stress or strain dependent variable of said model; and
    associating said fitted at least one variable to said applied stress or strain.

19. The method of claim 18, wherein the steps of said method are performed a plurality of times with said portion having different levels of stress or strain applied.

20. The method of claim 18, wherein said associating comprises:
    entering said fitted variable and said applied stress or strain into a look-up table.

21. The method of claim 18, wherein said associating comprises:
    fitting an equation to the fitted variable and applied stress or strain measurements.

22. An apparatus adapted to measure the stress or strain of a portion of a ferromagnetic member, said apparatus comprising:
    a controller adapted to generate and measure a magnetic hysteresis loop in said portion;
    a processor adapted to fit a model of a magnetic hysteresis loop to a hysteresis loop measured by said controller by varying at least one stress or strain dependent variable of said model; and
    a determinator adapted to generate an electrical signal representing the stress or strain in said portion using said fitted stress or strain dependent variable from said processor.

23. The apparatus of claim 22, further comprising:
    a magnetic field generator for generating a magnetic field in said portion.

24. The apparatus of claim 23, wherein said magnetic field generator is built into said ferromagnetic member or a structure of which said ferromagnetic member is a part.

25. The apparatus of claim 22, further comprising:
    a flux density sensor for measuring flux density in said portion.

26. The apparatus of claim 25, wherein said flux density sensor is built into said ferromagnetic member or a structure of which said ferromagnetic member is a part.

27. The apparatus of claim 22, wherein said determinator includes material specific data.

28. The apparatus of claim 22, wherein said controller is adapted to generate and measure a second magnetic hysteresis loop in said portion.

29. The apparatus of claim 28, wherein the second magnetic hysteresis loop is measured in a direction orthogonal to the direction in which the first hysteresis loop is measured.

30. The apparatus of claim 22, wherein said processor is adapted to determine two points of coincidence of said first and second measured magnetic hysteresis loops.

31. The apparatus of claim 22, wherein said processor is adapted to determine two points on said measured hysteresis loop(s) at predetermined applied field strength for that material.

32. The apparatus of claim 22, wherein said processor is adapted to determine the field strength and flux density of said measured hysteresis loop(s) at saturation.

33. The apparatus of claim 22, wherein said model is a predator/prey pursuit model wherein the prey is the applied field and the predator is the flux density.

34. The method of claim 33, wherein the predator/prey pursuit model includes an acceleration term for the predator.

35. The apparatus of claim 22, wherein the model is based on the following equation:

$$B = B^* + \underline{b}\left(\frac{(1 - e^{-k(H-H^*)/a})}{(1 - e^{-k})}\right)\left(\frac{H - H^*}{a}\right)^{1/r}$$

in which B is the flux density, H is the field strength, $B_S$ is the flux density at saturation, $H_S$ is the field strength at saturation, $B^*$ is the flux density at the point of coincidence, $H^*$ is the field strength at the point of coincidence, $b=B_S-B^*$, $a=H_S-H^*$ and k and r are said stress or strain dependent variables.

36. The apparatus of claim 22, wherein each said at least one variable depends on the longitudinal and transverse strains or stresses of said portion.

37. The apparatus of claim 22, wherein the at least one variable takes the form $$e^{-(x-y)^2}.$$

38. The apparatus of claim 22, wherein said controller is adapted to apply a magnetic field to the portion increasing from zero to a value at which the portion is saturated and decreasing through zero to a value at which the portion is again saturated in the opposite direction, and returning to zero.

39. A method of measuring the stress or strain of a portion of a ferromagnetic member, said method comprising:
    measuring, with a controller, a first magnetic hysteresis loop of said portion;
    measuring, with the controller, a second magnetic hysteresis loop of said portion in a direction orthogonal to the direction in which said first magnetic hysteresis loop is measured; and
    using said measured data to generate an electrical signal representing the stress or strain of said portion in two dimensions.

40. An apparatus adapted to measure the stress or strain of a portion of a ferromagnetic member, said apparatus comprising:
    a controller adapted to generate and measure two magnetic hysteresis loops in said portion in directions orthogonal to one another; and
    a processor to determine the stress or strain in said portion on the basis of said measured magnetic hysteresis loops and to generate an electrical signal representative of the stress or strain of said portion.

* * * * *